United States Patent
Baker et al.

(10) Patent No.: US 7,468,966 B2
(45) Date of Patent: Dec. 23, 2008

(54) METHOD AND APPARATUS FOR PERFORMING NEIGHBOR TRACKING IN A WIRELESS LOCAL AREA NETWORK

(75) Inventors: Michael H. Baker, Elmhurst, IL (US); Stephen P. Emeott, Rolling Meadows, IL (US); Aparna Pandey, Chicago, IL (US); Floyd Simpson, Lake Worth, FL (US); Brian K. Smith, Wellington, FL (US); Timothy J. Wilson, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 595 days.

(21) Appl. No.: 11/026,151

(22) Filed: Dec. 30, 2004

(65) Prior Publication Data

US 2006/0146834 A1 Jul. 6, 2006

(51) Int. Cl.
*H04Q 7/00* (2006.01)
*H04Q 7/20* (2006.01)

(52) U.S. Cl. .............. 370/332; 370/311; 370/312; 455/436; 455/437

(58) Field of Classification Search .......... 370/311, 370/312, 331, 332, 338, 349, 441, 461; 455/436, 455/432.1, 437, 574, 569; 340/7.32, 7.38
See application file for complete search history.

(56) References Cited

U.S. PATENT DOCUMENTS

| | | | | |
|---|---|---|---|---|
| 6,804,542 | B1 * | 10/2004 | Haartsen | 455/574 |
| 6,980,823 | B2 * | 12/2005 | Challa et al. | 455/522 |
| 2003/0023761 | A1 * | 1/2003 | Jeansonne et al. | 709/250 |
| 2004/0090929 | A1 * | 5/2004 | Laux et al. | 370/311 |
| 2004/0110530 | A1 * | 6/2004 | Alone et al. | 455/552.1 |
| 2004/0203389 | A1 * | 10/2004 | Kojima et al. | 455/41.2 |
| 2004/0218562 | A1 * | 11/2004 | Orava et al. | 370/329 |
| 2005/0128988 | A1 * | 6/2005 | Simpson et al. | 370/338 |
| 2005/0247775 | A1 * | 11/2005 | Gloekler et al. | 235/375 |
| 2006/0111103 | A1 * | 5/2006 | Jeong et al. | 455/434 |
| 2006/0120314 | A1 * | 6/2006 | Krantz et al. | 370/311 |
| 2007/0093201 | A1 * | 4/2007 | Hsu et al. | 455/3.04 |

* cited by examiner

*Primary Examiner*—Aung S Moe
*Assistant Examiner*—Awet Haile (57) ABSTRACT

In the present invention, the subscriber unit (200) obtains a set of access point identifiers and measurement opportunity information for each access point identifier. A first measurement is performed on a first access point identified from the set of access point identifiers. A current timer value is determined after completing the step of performing, and a second access point identified from the set of access point identifiers in which to perform a second measurement is selected. Selecting the second access point is based on at least the measurement opportunity information for the second access point in relation to the current timer value.

7 Claims, 7 Drawing Sheets

| FIELDS | SIZE(BYTES) |
|---|---|
| 402 NO. OF APs | 1 |
| 404 AP1 BSSID | 6 |
| 406 AP1 CHANNEL NO. | 1 |
| 408 AP1 MEASUREMENT OPPORTUNITY INFO | 2(OR 4) |
| 410 AP1 INTERVAL | 2 |
| 412 AP1 MAX SCAN TIME | 2 |
| AP2 BSSID | 6 |
| AP2 CHANNEL NO. | 1 |
| AP2 MEASUREMENT OPPORTUNITY INFO | 2(OR 4) |
| AP2 INTERVAL | 2 |
| AP2 MAX SCAN TIME | 2 |
| . . . | . . . |

| POWER TRANSITION PROFILE | DECISION CRITERION |
|---|---|
| 600 — CONVENTIONAL WARM DOWN/UP | $D_{xy} > A$ |
| 604 — FAST WARM DOWN/UP | $B < D_{xy} < A$ |
| 608 — STAY AWAKE | $C < D_{xy} < B$ |

METHOD AND APPARATUS FOR PERFORMING NEIGHBOR TRACKING IN A WIRELESS LOCAL AREA NETWORK

FIELD OF THE INVENTION

The present invention relates generally to a method and apparatus for performing neighbor tracking in a wireless local area network (WLAN).

BACKGROUND OF THE INVENTION

WLAN-based networks are being envisioned as the next-generation multi-service networks for enterprises, which utilize the same network to support a variety of services. Such networks provide a cost-effective solution to fulfill the communication needs of enterprises. Voice telephony still forms a popular communication mode in such an environment. Voice traffic, however, has stringent delay requirements and further, enterprise network users will have a greater expectation for high quality service than a typical residential user.

One source of degradation of voice quality in a mobile environment is due to handover latency. Since 802.11 coverage is much less than a cellular system, a typical enterprise voice over the Internet protocol (VoIP) user walking down a hallway might encounter multiple handovers within a voice call compounding the degradation of voice quality due to handovers.

Figure 1:
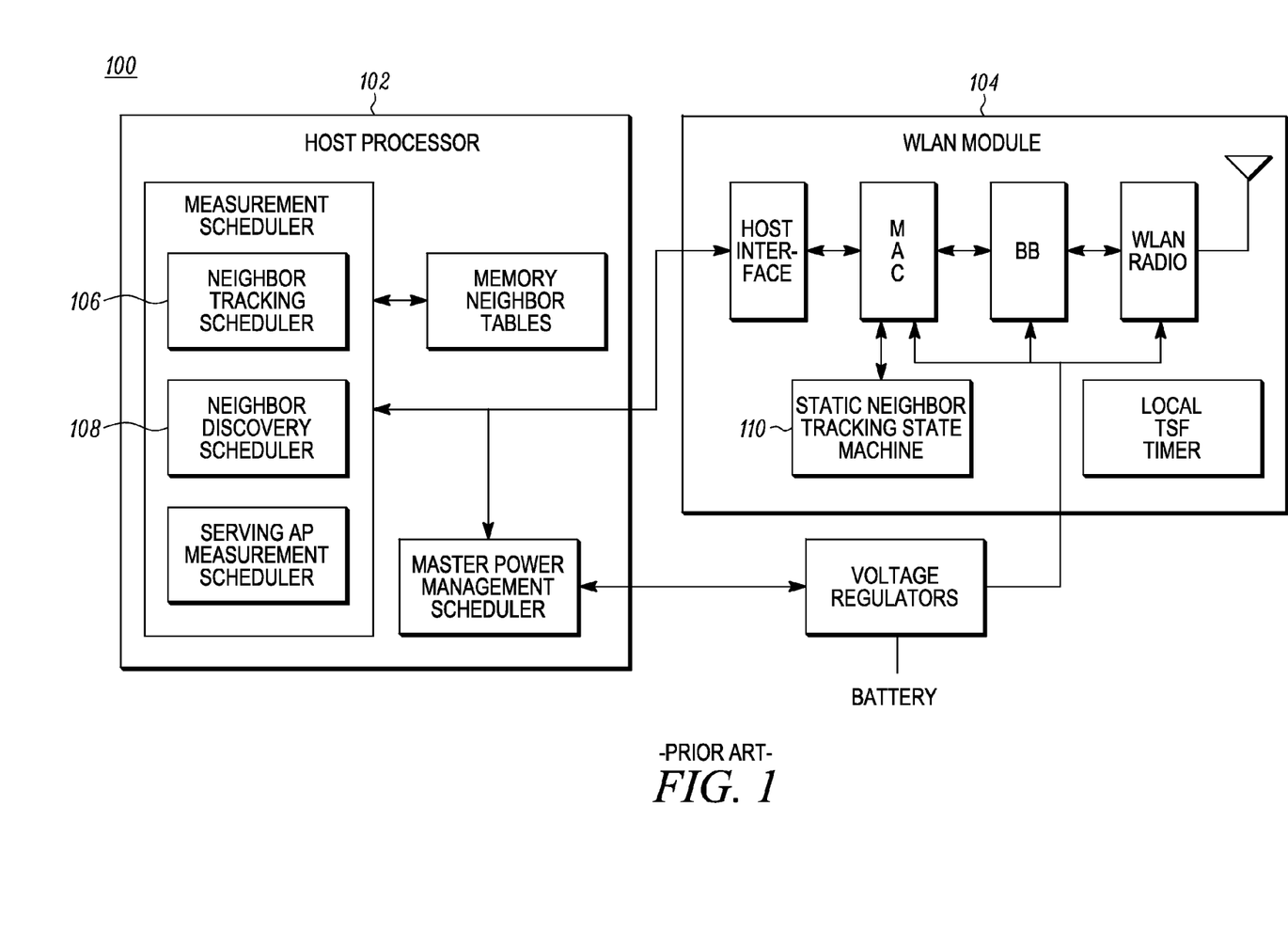
FIG. 1 (prior art) illustrates a high-level block diagram of an exemplary subscriber unit in accordance with the prior art.

There are three main measurement tasks that are performed by the subscriber unit in order to support subscriber-driven fast handover: measurement of serving access point (AP) signals, neighbor discovery, and neighbor tracking. An overview of the relationship between these processes within the subscriber unit 100 is illustrated in FIG. 1. Signals from the serving AP are measured by monitoring beacons from the serving AP. The serving AP is the AP in which the subscriber unit is currently associated with. In order to accomplish the other two tasks, i.e., neighbor discovery and neighbor tracking, the subscriber unit must take a "vacation" from its primary frequency.

In order to discover neighboring APs, the subscriber unit 100 periodically scans all the frequencies by broadcasting probe requests. Once the neighboring APs are discovered, the subscriber unit 100 tracks the signal strength of the neighboring APs that are perceived to be handover targets. The subscriber unit 100 performing neighbor tracking keeps track of the expected transmission time of the beacons from the neighboring APs, which aid signal strength measurements. The subscriber unit 100 subsequently uses the expected transmission times of the beacons to minimize the amount of time spent scanning the frequency.

For the current neighbor tracking algorithm, the responsibility of the measurement collection process is shared between the host processor 102 and the WLAN module 104. In particular, the host processor 102 schedules all the measurement collection processes, whereas the WLAN module 104 only executes the schedule by passively scanning the table of neighboring APs from a static schedule. At the end of the measurement collection, the WLAN module 104 provides the host processor 102 with measurement metrics, such as the received signal strength indicator (RSSI), etc.

Both the host processor 102 and the WLAN module 104 play a role in implementing neighbor tracking in the current algorithm. In the current algorithm, the neighbor tracking scheduler 106 resides in the host processor 102. The neighbor tracking scheduler 106 compiles a table comprising each neighboring AP to be passively scanned. Based upon the information it receives from the neighbor discovery scheduler 108, the neighbor tracking scheduler 106 determines the order in which the WLAN module 104 should take measurements and provides this information to the WLAN module 104 in a static schedule. The WLAN module 104 performs the neighbor tracking algorithm for the given neighboring APs in the exact order provided in the table compiled by the neighbor tracking scheduler 106 and reports the results back to the host processor 102.

A disadvantage to the current neighbor tracking algorithm is that the neighbor tracking scheduler 106 generates the static schedule dictating the order in which the WLAN module 104 is to listen for each neighboring AP. In other words, all the neighboring APs are passively scanned in a given order dictated a priori by the host processor 102, which does not change dynamically within a measurement window. Even if the neighbor discovery algorithm does a good job of identifying the expected transmission times of the beacons, there is no guarantee that the neighbor tracking algorithm will be able to effectively measure beacons transmitted from the neighboring APs. With contention-based systems, such as WLAN, the transmissions of the beacons can be significantly delayed due to loading at the neighboring AP. In addition, a variety of environmental factors, including multi-path, shadowing, fading, interference and collision may cause the subscriber unit to miss the detection of a beacon.

Current neighbor tracking algorithms compensate for the beacon uncertainty by either locking onto a neighboring channel and scanning the frequency for extended periods of time or by spacing AP measurements far enough apart in the time domain to avoid missing a beacon while scanning for a different one. As a result, the static schedule forces the WLAN module to enter a power save state after each measurement and wake up before the next measurement, thus requiring a full conventional warm up/warm down of the WLAN module before/after each passive scan.

A more intelligent neighbor tracking algorithm would take advantage of opportunities to make multiple passive neighbor scans each time the WLAN module is powered up. If properly executed, this intelligent algorithm would reduce the power drain contributed to warm down/up to less than the prior art's one warm down/up cycle per passive scan.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

The present invention implements a subscriber unit that performs neighbor tracking by passively scanning neighboring access points (APs) in a wireless local area network (WLAN). The neighboring APs may belong to a heterogeneous network, such as, but not limited to, 802.xx (e.g., 802.11(a), 802.11(b), 802.11(g), 802.15, 802.16, cellular networks, or the like. For purposes of describing the present invention, the subscriber unit comprises a host processor and a WLAN module, wherein the WLAN module schedules and executes the passive scanning process in accordance with the present invention. When the subscriber unit desires to passively scan the neighboring APs in order to measure their respective measurement opportunities, the host processor compiles a table that identifies at least a set of neighboring APs for the WLAN module to scan and provides measurement opportunity information that the WLAN module uses to calculate an estimated transmission time for the measurement opportunities transmitted from each neighboring AP. For purposes of the present invention, an example of a measurement opportunity is a beacon that is transmitted from an AP as known to those individuals skilled in the art of WLAN, an unsolicited probe response transmitted periodically and at clock intervals known to the subscriber unit or any other broadcast measurement frame transmitted from the AP that provides information required by a subscriber unit to estimate signal quality and forecast the timing of future measurement opportunities. Once compiled, the host processor forwards the table to the WLAN module. Upon receipt of the table, the WLAN module determines the most appropriate AP to scan from the table and performs the passive scan. After the scan is completed, the WLAN module tags the AP that has just been successfully scanned, determines the next most appropriate AP to scan that has not yet been scanned/tagged, selects the appropriate power transition profile (i.e., warm down sequence, sleep mode and warm up sequence), and performs the next passive scan accordingly. This process repeats after each scan is completed until all the neighboring APs identified in the table have been scanned/tagged. Determining the most appropriate neighboring AP to scan is based on at least the estimated transmission times for the measurement opportunities for each neighboring AP that has not yet been scanned in relation to a current timer value. A transmission interval for each AP and the available power transition profiles (i.e., warm down/up options) may also be considered when determining the most appropriate AP to scan. As such, the dynamic behavior of the WLAN module is a result of a combination of, after each scan is completed, selecting the most appropriate AP to scan that has not yet been scanned and the appropriate power transition profile to use between scans, if necessary, thus minimizing the average power consumed by the subscriber unit during neighbor tracking. Let us now refer to the figures to describe the present invention in greater detail. It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

Figure 2:
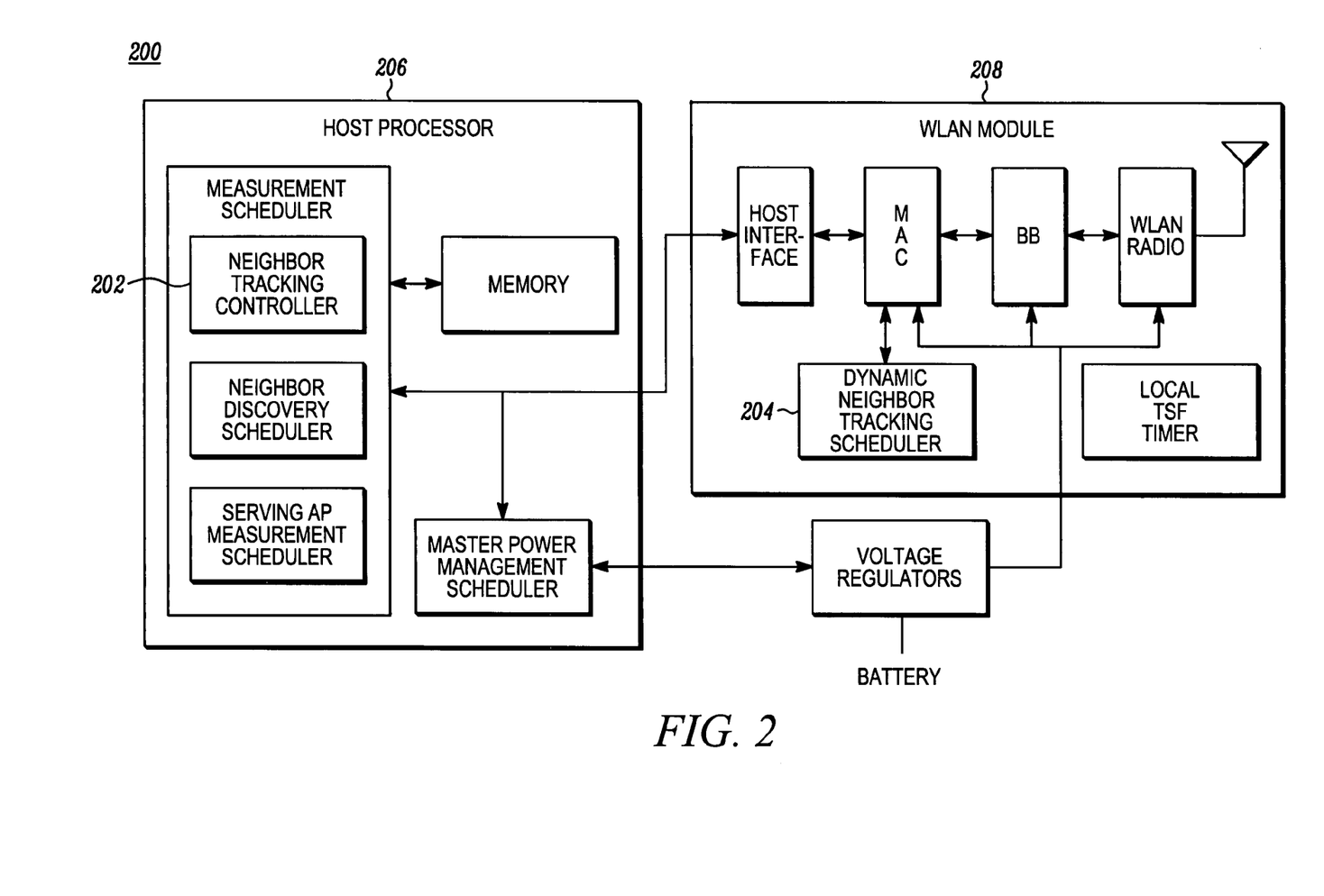
FIG. 2 illustrates a high-level block diagram of an exemplary subscriber unit comprising a host processor and a WLAN module in accordance with the present invention.

FIG. 2 illustrates a high-level block diagram of an exemplary subscriber unit 200 implementing a WLAN neighbor tracking procedure in accordance with the present invention. The exemplary subscriber unit 200 illustrated in FIG. 2 replaces the neighbor tracking scheduler 106 depicted in FIG. 1 with a neighbor tracking controller 202, and replaces the static neighbor tracking state machine 110 with a dynamic neighbor tracking scheduler 204. It is important to note that the actual components depicted in FIG. 2 are for example purposes only and that the host processor 206 and/or the WLAN module 208 of the exemplary subscriber unit 200 can comprise less, more and/or different components than those depicted in FIG. 2 and still remain within the spirit and scope of the present invention. It should also be noted that the components of the exemplary subscriber unit 200 may be implemented in firmware, hardware, software, or a combination thereof and still remain within the spirit and scope of the present invention.

Figure 3:
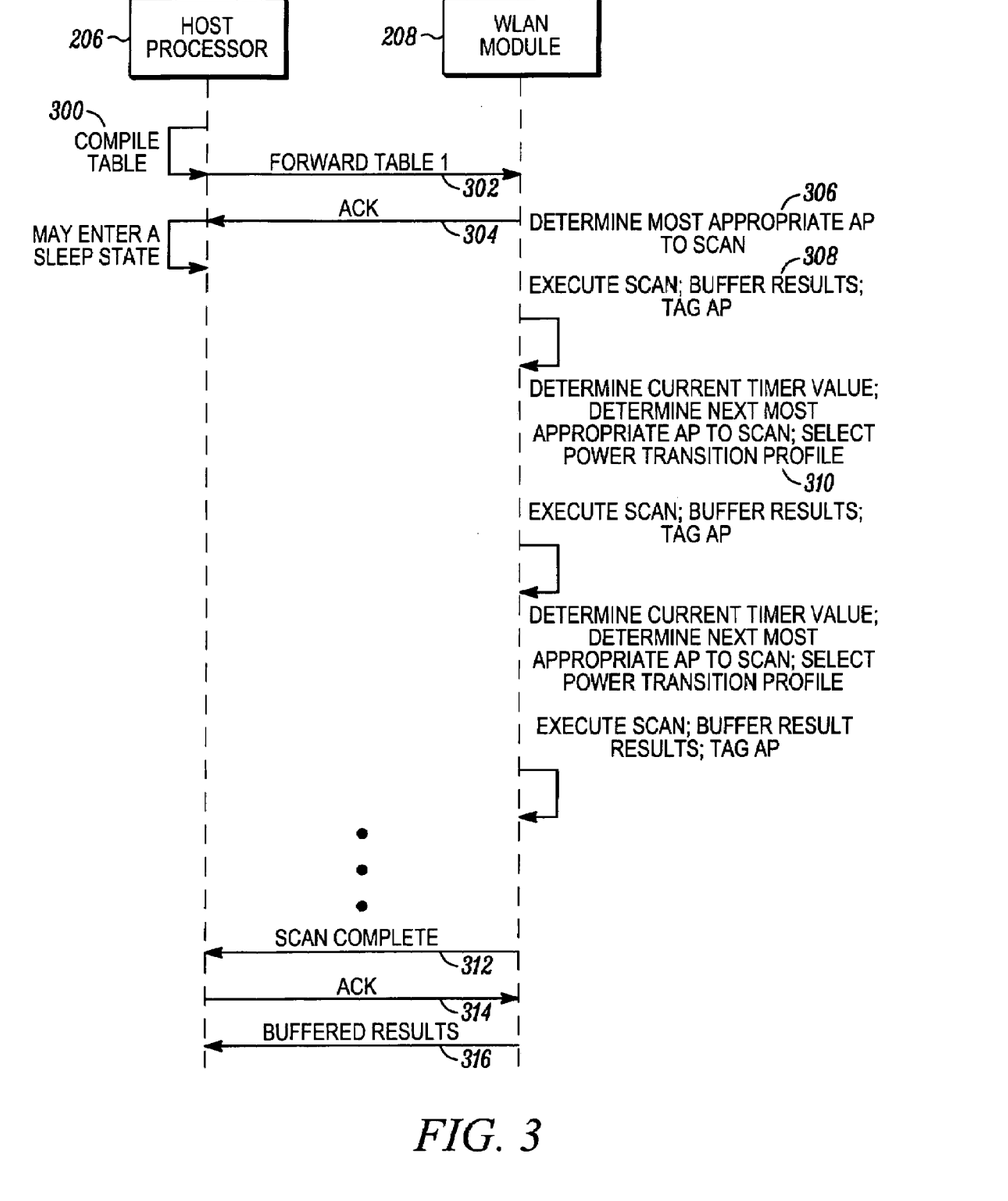
FIG. 3 illustrates a message exchange sequence between the host processor and the WLAN module of the subscriber unit of FIG. 2 in accordance with the present invention.

FIG. 3 illustrates a message exchange sequence between the host processor 206 and the WLAN module 208. Unlike the prior art, most of the intelligence required for neighbor tracking in the present invention resides in the WLAN module 208 (i.e., the WLAN module schedules and executes the passive scanning process). In operation, the host processor 206 compiles a table (an example of which is illustrates in FIG. 4 below) that identifies at least a set of neighboring APs to passively scan and the measurement opportunity information and the measurement interval for each AP (300). Once the table is compiled, the host processor 206 forwards the table to the WLAN module 208 (302). Upon receipt of the table, the WLAN module 208 sends an acknowledgement to the host processor 206 (304); the host processor 206 may enter a sleep state after receipt of the acknowledgement. The WLAN module 208 determines "on the fly" the most appropriate AP to passively scan from the table that has not yet been scanned (306). The WLAN module 208 executes the passive scan on the most appropriate AP that has not yet been successfully scanned, buffers the results, and tags the AP as being successfully scanned (308). The WLAN module 208 then determines the current timer value and determines the next most appropriate AP to passively scan that has not yet been successfully scanned based on the measurement table 300 it receives from the host processor 206, after which, the WLAN module 208 selects the appropriate power transition profile accordingly (310). These process steps 308 and 310 are repeated until all the APs identified in the table have been successfully scanned or attempted to be scanned a predetermined number of times. After the scans are completed, the WLAN module 208 sends an interrupt to the host processor 206 (312). Upon receipt of an acknowledgement from the host processor 206 (314), the WLAN module 208 forwards the buffered results to the host processor 206 (316).

Figure 4:
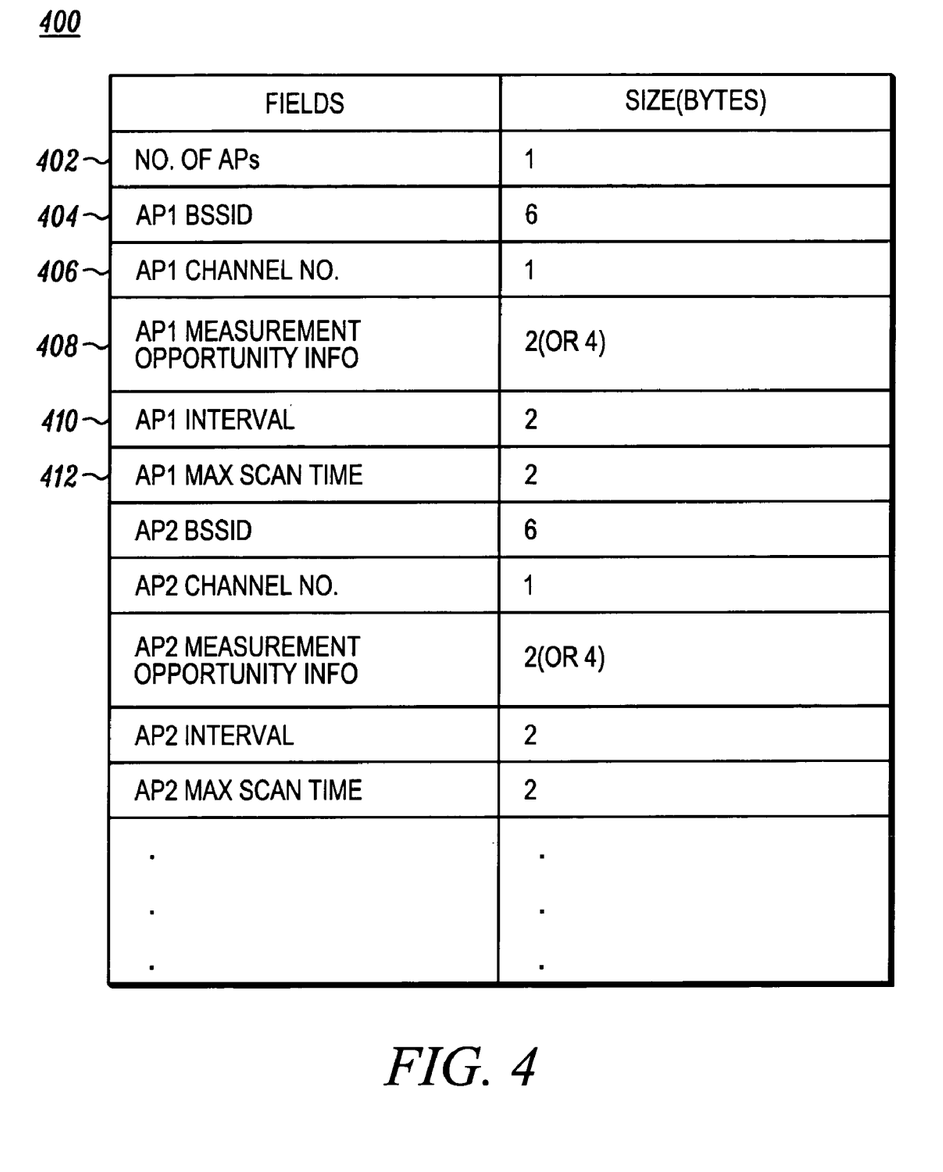
FIG. 4 illustrates an exemplary table in accordance with the present invention.

An exemplary table 400 used in accordance with the present invention is illustrated in FIG. 4. In this exemplary table 400, the host processor 206 identifies the total number of neighboring APs for the WLAN module 208 to scan 402. Also identified in the exemplary table 400 are five fields created for each neighboring AP identified to be scanned: a basic service set identification (BSSID) field 404, a channel number field 406, a measurement opportunity information field 408, an interval field 410, and a maximum scan time field 412. The BSSID field 404 specifies a unique identification number for the neighboring AP. The channel number field 406 specifies the operating frequency for the neighboring AP. The measurement opportunity information field 408 specifies the timing offset between the timing synchronization function (TSF) time of the subscriber unit and the TSF time of the given neighboring AP. In one embodiment, the value specified in the measurement opportunity information field 408 is calculated by taking the difference between the TSF time of the given neighboring AP and the local TSF time of the subscriber unit, and then taking the modulo of the difference and the value of the interval field 410 for the given neighboring AP. Written as an equation, the measurement opportunity information field 408, $\text{Offset}_n$, equals:

$$\text{Offset}_n = \text{mod}[(TSF_n - TSF_{local}), \text{Interval}_n],$$

where $TSF_n$ equals the neighboring AP TSF time, $TSF_{local}$ equals the local TSF time, and $\text{Interval}_n$ equals the interval between measurement opportunities for the neighboring AP. In an alternate embodiment, the value specified in the measurement opportunity information field 408 equals the TSF time of the subscriber unit when any one of a plurality of measurement opportunities occur for the neighboring AP.

The measurement opportunity interval field 410 specifies the interval between the transmissions of measurement opportunities for the given neighboring AP. The maximum scan time field 412 specifies the maximum time that the subscriber unit 200 is allowed to scan for a measurement opportunity; without this field 412, the subscriber unit 200 scans indefinitely when a measurement opportunity is missed. These five fields are repeated in the table 400 for each neighboring AP identified in the table 400. It is important to note that the table 400 may comprise more, less or different fields and still remain within the spirit and scope of the present invention. Once compiled, the host processor 206 forwards the table 400 to the WLAN module 208.

Figure 5:
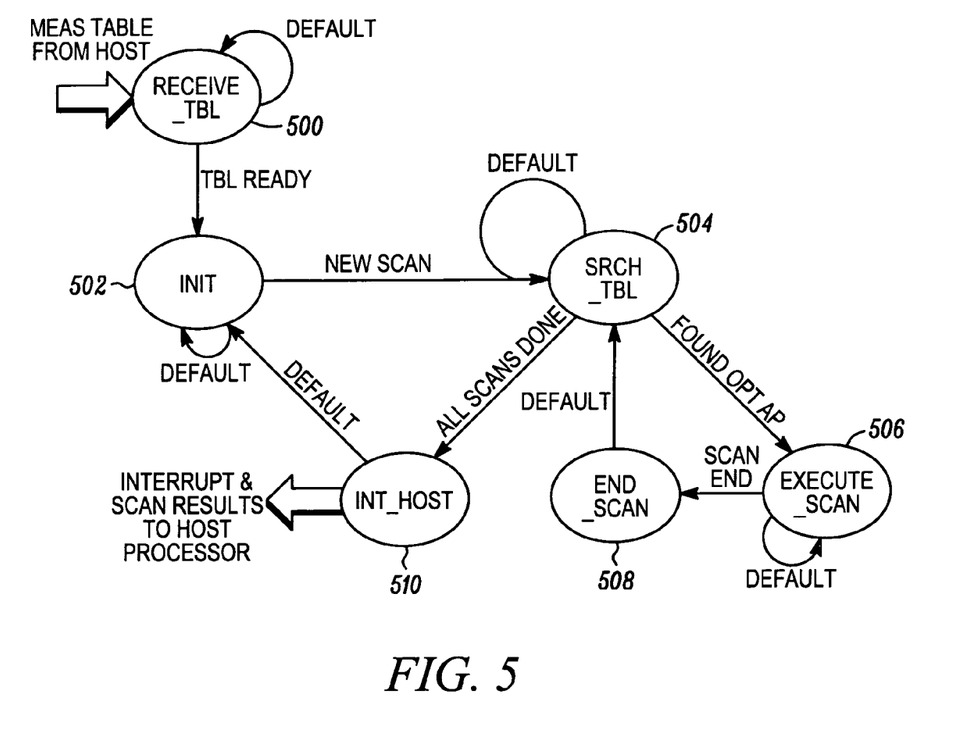
FIG. 5 illustrates at least a portion of the WLAN module of FIG. 2 being implemented as a finite state machine in accordance with the present invention.

At least a portion of the WLAN module 208 can be implemented as a finite state machine; for ease of explanation, the following description refers to the WLAN module 208 even if only a portion of the WLAN module 208 transitions through the various states. One example of such a finite state machine is illustrated in FIG. 5. As illustrated, until the WLAN module 208 receives the table 400 from the host processor 206, the WLAN module 208 remains in the RECEIVE_TABLE state 500. Upon receipt of the table, the WLAN module 208 transitions to the INIALIZATION state 502. While in the INITIALIZATION state 502, the WLAN module 208 initializes parameters and variables required for implementing the search algorithm (e.g., counter values, etc.). The WLAN module 208 remains in the INITIALIZATION state 502 until a command is received from the host processor 206 to start a passive scan of the neighboring APs identified in the table 400. Once the command is received, the WLAN module 208 transitions to the SEARCH_TABLE state 504.

While in the SEARCH_TABLE state 504, the WLAN module 208 selects the most appropriate neighboring AP to passively scan that has not yet been successfully scanned from the table 400; however, if all of the neighboring APs in the table 400 have been successfully scanned, then the WLAN module 208 transitions to the INTERRUPT_HOST state 510 (described below). Each time the SEARCH_TABLE state 504 is entered, the current value of the local TSF timer is used in combination with the table 400 and the set of neighboring APs that have not yet been successfully scanned in order to determine the next most appropriate neighboring AP to scan. In one embodiment, the amount of time remaining until the next measurement opportunity is calculated for each neighboring AP that has not yet been successfully scanned. The time remaining is calculated by taking the measurement opportunity interval field 410 for that AP and subtracting from it the time that has passed since the last measurement opportunity for the given neighboring AP. The time that has passed since the last measurement opportunity may be calculated by taking the sum of the local TSF time of the subscriber unit and the offset value conveyed in the measurement opportunity information field 408 for that neighboring AP, and taking the modulo of the sum and the interval field 410 for that neighboring AP. The time remaining until the next measurement opportunity may then be calculated by subtracting the time that has passed since the last measurement opportunity from the interval field 410 for that neighboring AP. Written as an equation, the time remaining until the next measurement opportunity for a neighboring AP that has not yet been successfully scanned, $T_r$, equals:

$$T_r = \text{Interval}_n - \text{mod}[(TSF_1 + \text{Offset}_n), \text{Interval}_n],$$

where $\text{Interval}_n$ equals the measurement opportunity interval field 410, $\text{Offset}_n$ equals the measurement opportunity information field 408 and $TSF_1$ equals the local TSF time of the subscriber unit.

In an alternate embodiment, the amount of time remaining until the next measurement opportunity is calculated for each neighboring AP that has not yet been successfully scanned by taking the measurement opportunity interval field 410 for the neighboring AP and subtracting from it the time that has passed since the last measurement opportunity for the given neighboring AP, as indicated by the value of the measurement information offset field 408 in an alternate embodiment. The time that has passed since the last measurement opportunity may be calculated by taking the difference of the local TSF time of the subscriber unit and the TSF time of the given neighboring AP when any one of a plurality of measurement opportunities occurs for the given neighboring AP, and then taking the modulo of the difference and the interval field 410 for the given neighboring AP. Written as an equation, the time remaining until the next measurement opportunity for a neighboring AP that has not yet been successfully scanned, $T_r$, equals:

$$T_r = \text{Interval}_n - \text{mod}[(TSF_{local} - TSF_{NMF}), \text{Interval}_n],$$

where $\text{Interval}_n$ equals the interval field 410, $TSF_{NMF}$ equals the measurement opportunity information field 408 for the given neighboring AP and $TSF_{local}$ equals the local TSF time.

In another alternate embodiment, the number of modulo calculations can be reduced when all the interval fields 410 for the neighboring AP are the same. For this case, the measurement opportunities transmitted from the neighboring APs occur in the same relative position within the subscriber unit's measurement interval. The exemplary neighboring AP table 400 is stored in a pre-sorted manner based on the timing offset value, $\text{Offset}_n$, where $\text{Offset}_n$ is calculated as shown previously. Each time the SEARCH_TABLE state 504 is entered, the time that has elapsed since the serving AP's previous measurement opportunity equals:

$$T_{elapsed} = \text{mod}[TSF_{local}, \text{Interval}_{local}]$$

where, $TSF_{local}$ equals the local TSF time and $\text{Interval}_{local}$ equals the interval between measurement opportunities for the serving AP, which is the same as the interval between measurement opportunities for all the APs in the neighboring AP table 400. The time remaining $T_r$ until the next measurement opportunity for a neighboring AP that has not yet been successfully scanned, $T_r$, equals:

$$T_r = \text{Offset}_n - T_{elapsed} \quad \text{if } \text{Offset}_n > T_{elapsed}$$
$$= \text{Interval}_{local} - (T_{elapsed} - \text{Offset}_n) \quad \text{otherwise}$$

Note that in an exemplary embodiment, the calculated next measurement opportunity occurrence time for a given neighboring AP includes the time required to process the measurement opportunity, switch channels, compensate for jitter, etc.

Figure 6:
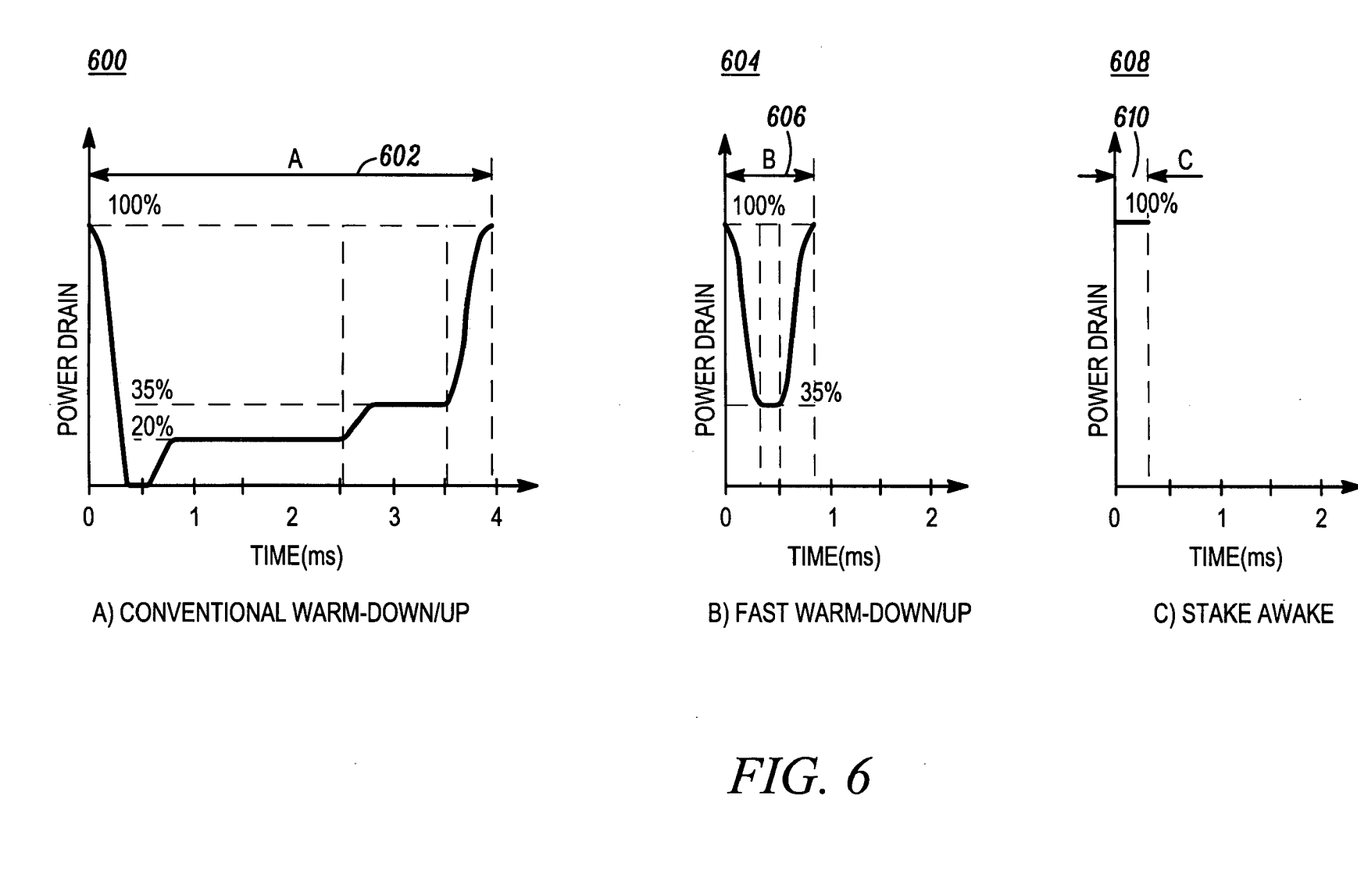
FIG. 6 illustrates three typical power transition profiles of a WLAN module in accordance with the present invention.
Figure 7:
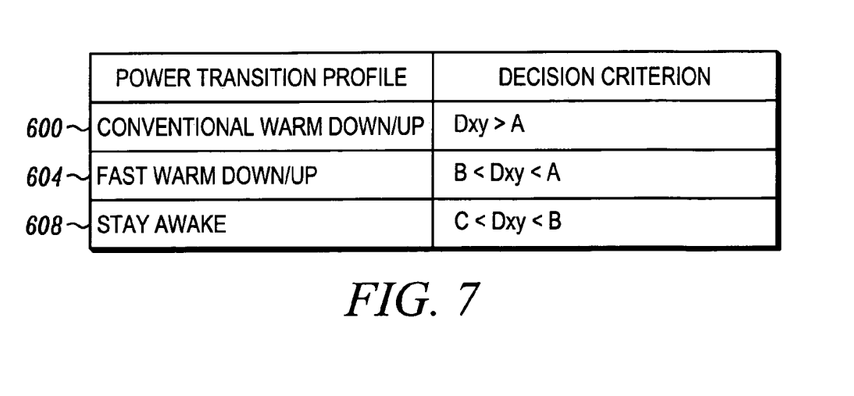
FIG. 7 illustrates a table utilized by the WLAN module to select an optimal power transition profile illustrated in FIG. 6 in accordance with the present invention.

While in the SEARCH_TABLE state 504, the WLAN module 208 compares the time remaining before each neighboring AP transmits its next measurement opportunity and selects the smallest positive value (optimal choice for best power efficiency). Further, the WLAN module 208 selects the optimal power transition profile to be used while waiting from the next measurement opportunity. The power transition profile is a combined warm-down, sleep mode and warm-up sequence needed to minimize power consumption. FIG. 6 describes three power transition profiles representative of a typical WLAN module 208. A power transition profile is defined as the minimum time needed to transition from full active receive to a desired sleep mode then back to full active receive. In order to select a given power transition profile for a given measurement, the time difference between the current timer and the next desired measurement must be longer than the power transition profile, as shown in FIG. 7. When the next measurement opportunity is farther out in time than the chosen power transition profile, the WLAN module 208 will remain in the desired sleep mode for the extra time.

After identifying the most appropriate neighboring AP to scan and selecting the optimal power transition profile, the WLAN module 208 executes the warm-down sequence of the power transition profile (if applicable) and waits in the power transition profile's sleep mode (if applicable) until time to warm-up the receiver in order to be ready for the next measurement opportunity. To initiate the warm-up sequence, the WLAN module 208 transitions to the EXECUTE_SCAN state 506. In the EXECUTE_SCAN state 506, the WLAN module 208 warms up the receiver (if applicable) and locks onto the channel number for the given neighboring AP at the calculated next measurement opportunity occurrence time for the given AP. The WLAN module 208 then starts a measurement timer and waits in full receive until either a measurement opportunity from the neighboring AP is received or the measurement timer reaches the maximum scan time 412. Received measurement opportunities are processed (e.g., measuring the received signal strength indicator (RSSI) and/ or the signal-to-noise ratio (SNR) of the measurement opportunity, or the like). The WLAN module 208 buffers the information about the measurement opportunity and transitions to the END_SCAN state.

In the END_SCAN state 508, the WLAN module 208 tags the scanned neighboring AP so that it is not re-selected in the SEARCH_TABLE state 504 for scanning. The WLAN module 208 also re-initializes the search variables. Once the scanned neighboring AP is tagged accordingly and the variables are re-initialized, the WLAN module 208 transitions back to the SEARCH_TABLE state 504.

In the INTERRUPT_HOST state 510, the WLAN module 208 determines that all the neighboring APs are found to be tagged, have been successfully scanned as required, or have been timed-out. The WLAN module 208 sends the host processor 206 an interrupt to indicate that the scan results are ready and the scan results (e.g., quality indicator, timing information, buffered measurement opportunities, etc.) are passed on from the WLAN module 208 to the host processor 206. Alternatively, instead of sending the interrupt to the host processor 206, the WLAN module 208 can use the scan results to update a local storage medium, especially the timing information, or if a schedule is maintained by the WLAN module 208, even to update the measurement schedule by adding, removing or reshuffling neighboring APs in the table allowing the host processor 206 to remain in the sleep state longer.

For static environments with little change in environmental variables, such as noise, interference and subscriber location, an intelligent WLAN module 208 may repeat a series of neighbor scans before waking the host processor 206. Between scans, the WLAN module 208 enters a sleep mode and sets a timer to wait until the next neighbor tracking interval elapses. At this point, the timer triggers a wake up of the WLAN module 208, and the WLAN module 208 commences a new neighbor tracking scan. When significant changes in RSSI or SNR are observed between sets of neighbor measurements, or when the signal quality of the serving AP drops below either an absolute threshold or a threshold relative to signal quality of one or more of the neighboring AP, the WLAN module 208 triggers an interrupt to wake the host processor 206. All information from each set of measurements is buffered by the WLAN module 208 and sent to the host processor 206 after the interrupt.

After the scan results are sent to the host processor 206 or used locally by the WLAN module 208, the WLAN module 208 returns to the RECEIVE_TABLE state 500 and enters a sleep mode until the next interrupt is received from the host processor 206 to begin a new scan or to perform other functions, such as receiving and transmitting traffic.

As the WLAN module 208 progresses through the table, it has the option of selecting a different power transition profile between measurement opportunities. The WLAN module 208 typically offers one or more power transition profiles from which to choose. There is a cost, however, associated with entering and exiting power transition profiles. In particular, when a WLAN module 208 exits power save mode to enter the active mode, it must progress through a warm up sequence. Except for cases with very light traffic, channel contention causes the prior art to incur the worst case full conventional warm up/down cost for each neighbor measurement as the measurement opportunities must be scheduled far enough apart to prevent overlapping measurement intervals. Depending upon the power transition profiles available and the capabilities of the WLAN module 208, warm-up during neighbor tracking can significantly reduce the current drain needed for warm up of the WLAN module 208. The present invention significantly reduces warm up/down power by replacing the costly full conventional warm up/down cycles with the partial warm up and stay awake modes available to the WLAN module 208.

For exemplary purposes only, three typical power transition profiles of a WLAN module 208 are illustrated in FIG. 6. The first power transition profile 600 is a full conventional warm-down to deep sleep mode followed by a conventional warm-up to full active mode. The conventional receiver (e.g., the WLAN module 208) warm-up starts from deep sleep and transitions through one or more pseudo-sleep modes as rapidly as possible until full active receive (i.e., 100% power drain) is reached. In a deep sleep mode, the WLAN module 208 switches off and consumes negligible amounts of power for only essential functionalities (e.g., clock, etc.). In pseudo-sleep mode, a part of the overall circuitry is kept operational resulting in non-negligible power drain. Two pseudo-sleep modes (20% and 35%) are shown in the conventional warm-up/down profile illustrated in FIG. 6. In practice, the number of stages could be more or less than three (e.g., 20%, 35%, 50% and 100%). As explained earlier, power transition profiles show the minimum time needed to warm-down to a sleep mode and return to full receive. Thus, the minimum amount of time needed to complete the first power transition profile 600 is A 602. The second power transition profile 604 is a fast warm down/up. In this second profile 604, a fast warm-down to a pseudo-sleep mode occurs and is followed by a fast warm-up back to 100% power drain. The minimum amount of time needed to complete the second power transition profile 604 is B 606. The third power transition profile 608 is a stay awake. In this third profile 608, the receiver stays awake at 100% power drain and immediately begins switching frequencies, if necessary, to prepare to receive a new measurement opportunity. The amount of time needed to complete the third power transition profile 608 is C 610. Carefully controlling when and how often the WLAN module 208 enters and exits a power save mode can realize significant savings in current drain.

As mentioned above, each time the WLAN module 208 completes a measurement scan, it must decide the most appropriate neighboring AP to passively scan next. In order to make this decision, the WLAN module 208 calculates how much time there is remaining before each measurement opportunity for each of the neighboring APs that have not yet been scanned. For purposes of the present invention, let this time be denoted as $D_{xy}$ (where x denotes the channel of the neighboring AP that has just been measured, and y denotes the channel of the neighboring AP to be scanned). The power transition profiles 600, 604, 608 illustrated in FIG. 6 have time constraints that must be met before they can be chosen. FIG. 7 illustrates how the WLAN module 208 uses the time constraints labeled in FIG. 6 in order to assess whether $D_{xy}$ meets the time constraints. For example, if $D_{xy}$ is greater than A 602, the WLAN module 208 selects the conventional warm-up/down profile 600 as the optimal power transition profile; if $D_{xy}$ is greater than B 604, but less than A 602, the WLAN module 208 selects the fast warm-down/up profile 604 as the optimal power transition profile; if $D_{xy}$ is greater than C 610, but less than B 606, the WLAN module 208 selects the stay-awake profile 608 as the optimal power transition profile.

Figure 8:
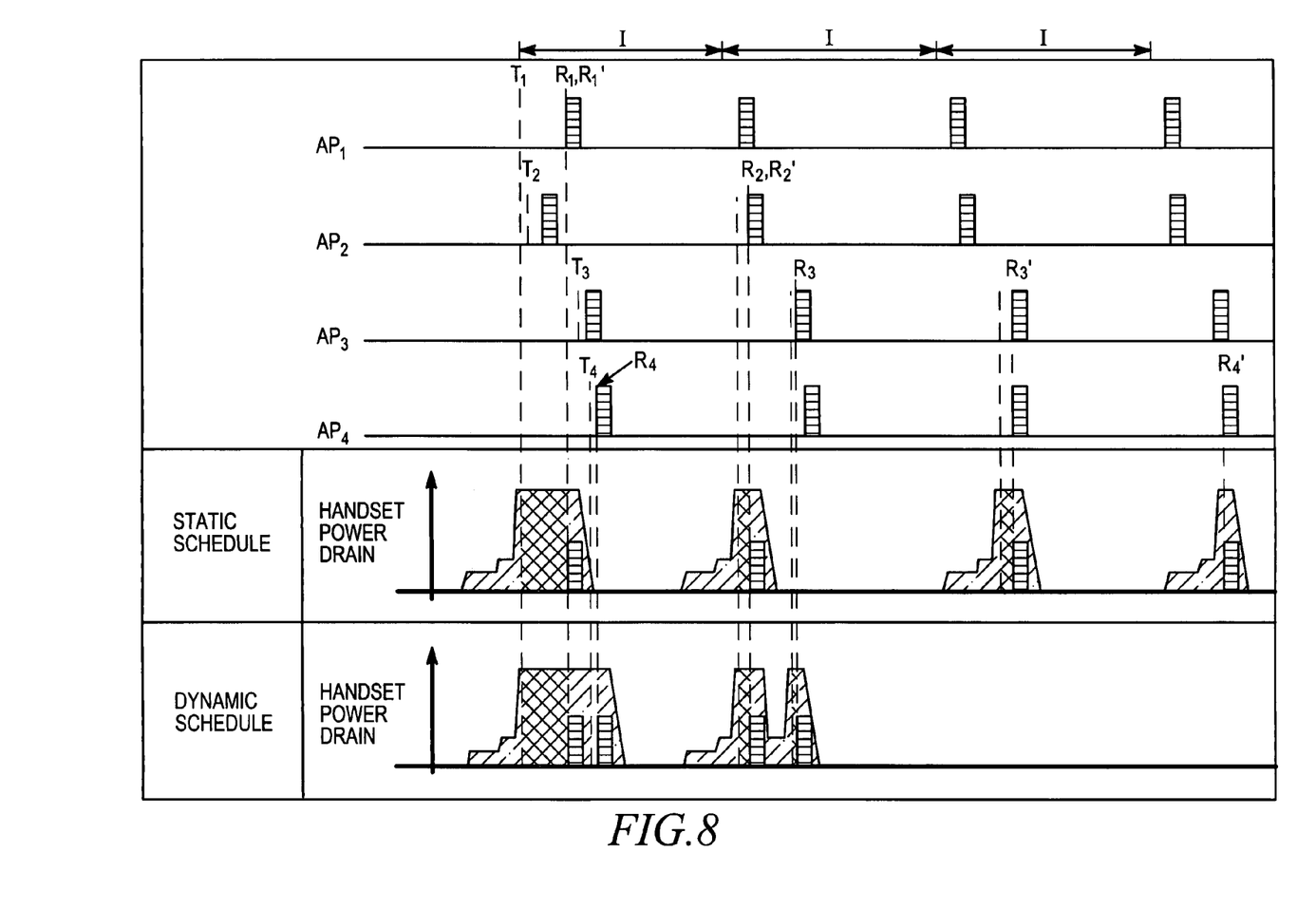
FIG. 8 illustrates a simple example of the operation of the subscriber unit of FIG. 1 compared to the operation of the subscriber unit of FIG. 2 in accordance with the present invention.

Let us now refer to FIG. 8 to illustrate a simple example implementing the present invention. This example compares the results of the prior art WLAN module 208 using a static schedule as described above in the background section with the results of the dynamic neighbor tracking state machine in accordance with the present invention. For this example, all the measurement opportunity intervals for each of the neighboring APs have been set to a common value for simplicity.

Let us first describe the example from the perspective of using a dynamic neighbor tracking state machine in accordance with the present invention. In this example, the host processor 206 compiles the table of neighboring APs to be scanned by the WLAN module 208 (i.e., $AP_1$, $AP_2$, $AP_3$ and $AP_4$) as described above. Upon receipt of the table, the WLAN module 208 identifies the estimated transmission times of the measurement opportunities from the neighboring APs, and the current value of the local TSF timer in order to select the first neighboring AP to scan. Based on these criteria, in this example, $AP_1$ is selected as the first AP to scan. The expected transmission time of the measurement opportunity for $AP_1$ is shown as $T_1$. The WLAN module 208 scans the frequency corresponding to $AP_1$ until its measurement opportunity is received at $R_1'$. Once the measurement opportunity is received, the WLAN module 208 tags $AP_1$, checks the current value of its local TSF timer, and calculates the times remaining until the next measurement opportunity is expected to occur for each AP that has yet to be scanned ($D_{12}$, $D_{13}$, $D_{14}$ for $AP_2$, $AP_3$ and $AP_4$, respectively). In this example, the WLAN module 208 determines it is unable to receive the measurement opportunities from $AP_2$ and $AP_3$, because $D_{12}$ and $D_{13}$ are negative, indicating the measurement opportunity has been missed. The WLAN module 208, however, determines that it can receive the next measurement opportunity from $AP_4$ that is expected to be transmitted from $AP_4$ at $T_4$ by selecting a "stay awake" power transition profile. As such, the WLAN module 208 remains powered up after completing the passive scan of $AP_1$, and begins to passively scan the frequency for $AP_4$ until the measurement opportunity is received at $R_4$.

Once the measurement opportunity is received from $AP_4$, the WLAN module 208 calculates how much time there is remaining before each neighboring AP that has yet to be scanned is expected to transmit its next measurement opportunity. In this example, the WLAN module 208 determines that there is enough time to select a conventional warm-down/up power transition profile before the next estimated measurement opportunities are expected to be transmitted from $AP_2$ and $AP_3$ (i.e., Both $D_2$>A and $D_3$>A). Since the time remaining until the next measurement opportunity for $AP_2$ is less than that for $AP_3$ ($D_{42}$<$D_{43}$), $AP_2$ is selected as the next neighboring AP to be scanned. The WLAN module 208 warms down to deep sleep mode and waits for a period of time less than or equal to $D_{42}$-A, then begins the conventional warm-up in enough time to be ready to receive the measurement opportunity from $AP_2$ at $R_2$. The WLAN module 208 checks the current value of its local TSF timer against the remaining neighboring APs, which in this case is only $AP_3$. Looking at the current value of its local TSF timer and the estimated transmission time for the measurement opportunity from $AP_3$, the WLAN module 208 determines that there is enough time to perform a fast warm down/up power transition profile (i.e., $D_{23}$>B). The WLAN module warms down to a pseudo sleep mode for a period of time equal to $D_{23}$-B, then the fast warm-up is started in enough time for the WLAN module 208 to be ready to receive the measurement opportunity from $AP_3$ at $R_3$. Once all scans are completed, the WLAN module 208 sends an interrupt to the host processor 206 and forwards the scan measurements for each of the neighboring APs identified in the table along with the actual times in which the measurement opportunities were actually received by the WLAN module 208 (i.e., $R_1$, $R_2$, $R_3$ and $R_4$).

In contrast, as noted above in the background section, the WLAN module 104 using a static neighbor tracking state machine in accordance with the prior art must search for each measurement opportunity in the order dictated by the table received from the host processor 102. For this example, it is assumed that the measurement opportunities are ordered within the table based on expected arrival times. The static neighbor tracking state machine of the prior art is shown receiving the measurement opportunities in order: $AP_1$, $AP_2$, $AP_3$ and $AP_4$. When two neighboring APs in the table are scheduled to transmit their respective measurement opportunity close together, the static neighbor tracking state machine of the prior art will routinely schedule the measurement opportunities for any two neighboring AP at times that are sufficiently far apart to avoid an overlap of the measurements intervals. As such, referring to the example in FIG. 8, since the static neighbor tracking machine must scan the APs in the order dictated by the host processor 102, the static neighbor tracking machine receives the measurement opportunity transmitted from $AP_1$ at $R_1'$, receives the measurement opportunity transmitted from $AP_2$ at $R_2'$, receives the measurement opportunity transmitted from $AP_3$ at $R_3'$, and receives the measurement opportunity transmitted from $AP_4$ at $R_4'$. The static neighbor tracking state machine of the prior art will only schedule a second AP for scanning at a time long enough after the scheduled time for a first AP that there is little or no possibility for overlap of the measurement intervals, thereby increasing the amount of time required to collect a full set of measurements for each neighboring APs in the table.

While the above example uses the same measurement opportunity interval for all four APs and the serving AP, it shall be obvious to those of skill in the art that the method is readily extendable for a case when these measurement opportunity intervals are not equal. Multiple counters could be used to estimate the time remaining until the next measurement opportunities as described above. Alternatively, the number of counters could be reduced by using a master interval which is equal to the lowest common multiple of all measurement opportunity intervals. Hardware or software algorithms counting the master interval could predict the arrival times of the measurement opportunities for all neighbors. Further, the present invention is readily extendable to include neighboring APs belonging to heterogeneous networks including 802.11a/b/g, 802.16, 802.15, cellular networks etc. to support inter-technology neighbor tracking.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method comprising the steps of:
at a subscriber unit:
obtaining a set of access point identifiers and measurement opportunity information for each access point identifier;
performing a first measurement on a first access point identified from the set of access point identifiers;
determining a current timer value after completing the step of performing;
selecting a second access point identified from the set of access point identifiers in which to perform a second measurement, wherein the step of selecting is based on at least the measurement opportunity information for the second access point in relation to the current timer value; and
obtaining a measurement opportunity interval value for each access point identifier, and wherein the measurement opportunity information is a timing offset which is calculated by taking a difference between a timing synchronization function time of the subscriber unit and a timing synchronization function time of an access point, and then taking a modulo of the difference and the measurement opportunity interval value.

2. The method of claim 1 wherein the steps of claim 1 are performed by a wireless local area network module residing in the subscriber unit.

3. The method of claim 1 wherein the set of access point identifiers and the measurement opportunity information for each access point identifier is obtained by a wireless local area network module from a host processor in the subscriber unit.

4. A method comprising the steps of:
at a subscriber unit:
obtaining a set of access point identifiers and measurement opportunity information for each access point identifier;
performing a first measurement on a first access point identified from the set of access point identifiers;
determining a current timer value after completing the step of performing;
selecting a second access point identified from the set of access point identifiers in which to perform a second measurement, wherein the step of selecting is based on at least the measurement opportunity information for the second access point in relation to the current timer value;
selecting a power transition profile based on at least a time difference between the current timer value and an estimated transmission time of a next measurement opportunity for the second access point, wherein the estimated transmission time is derived from the measurement opportunity information for the second access point identifier;
wherein a difference between the current timer value and the estimated transmission time of the next measurement opportunity for the second access point is calculated by subtracting from a measurement opportunity interval value for the second access point a time that has passed since a transmission time of a last measurement opportunity for the second access point; and wherein the time that has passed since the last measurement opportunity is calculated by taking a sum of a timing synchronization function time of the subscriber unit and a timing offset, and then taking a modulo of the sum and the measurement opportunity interval value.

5. A method comprising the steps of:
at a subscriber unit:
obtaining a set of access point identifiers and measurement opportunity information for each access point identifier;
performing a first measurement on a first access point identified from the set of access point identifiers;
determining a current timer value after completing the step of performing;
selecting a second access point identified from the set of access point identifiers in which to perform a second measurement, wherein the step of selecting is based on at least the measurement opportunity information for the second access point in relation to the current timer value; and
wherein the time that has passed since the last measurement opportunity is calculated by taking a difference between a timing synchronization function time of the subscriber unit and a timing synchronization function time of the subscriber unit when a measurement opportunity is transmitted by the second access point, and then taking a modulo of the sum and the measurement opportunity interval value.

6. The method of claim 1 wherein the steps of claim 1 are implemented by a state machine.

7. The method of claim 1 wherein the first and second measurements are taken from a broadcast measurement frame transmitted by the first and second access points, respectively.

* * * * *